(12) United States Patent
Yoshida et al.

(10) Patent No.: US 6,265,332 B1
(45) Date of Patent: *Jul. 24, 2001

(54) COMBINED MOUSE, BALL AND MOUSE PAD

(75) Inventors: Takashi Yoshida, Kanagawa; Satoshi Taguchi, Tokyo; Hajime Yamamoto, Kanagawa; Masaki Amano, Chiba; Yasuo Suga, Shiga; Kazuyuki Sakai, Tokyo, all of (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/749,917

(22) Filed: Nov. 14, 1996

(30) Foreign Application Priority Data

Nov. 28, 1995 (JP) ................................... 7-308968
Nov. 30, 1995 (JP) ................................... 7-313189

(51) Int. Cl.$^7$ ................................................. B32B 5/18
(52) U.S. Cl. .................... 442/221; 442/315; 442/340; 442/370; 442/903; 442/85; 345/163
(58) Field of Search ................... 428/903, 85, 90, 428/92, 318.4; 248/118; 345/163; 442/221, 315, 370, 340

(56) References Cited

U.S. PATENT DOCUMENTS

| 4,147,574 | * | 4/1979 | Setsuie et al. ............. 428/903 |
| 4,799,054 | | 1/1989 | House . |
| 5,277,969 | * | 1/1994 | Borri et al. ............. 428/903 |

FOREIGN PATENT DOCUMENTS

| 0 098 604 | | 1/1984 | (EP) . |
| 0 328 225 | | 8/1989 | (EP) . |
| 0 352 999 | | 1/1990 | (EP) . |
| 2 288 223 | | 10/1995 | (GB) . |
| 402139449 | * | 5/1990 | (JP) . |
| 405093350 | * | 4/1993 | (JP) . |

* cited by examiner

Primary Examiner—Elizabeth M. Cole
(74) Attorney, Agent, or Firm—Schnader Harrison Segal & Lewis LLP

(57) ABSTRACT

A mouse pad including a fibrous sheet made of ultrafine fibers, and a substrate.

The mouse pad may be incorporated into a mouse pad package so that a part of the surface of the mouse pad provided by the fibrous sheet or a separate piece made of substantially the same material is exposed so that a consumer can touch it directly to confirm its touch and test its likely behavior as a mouse pad.

17 Claims, 2 Drawing Sheets

COMBINED MOUSE, BALL AND MOUSE PAD

FIELD OF THE INVENTION

This invention relates to a mouse pad, particularly to a mouse pad designed to prevent accumulation of foreign materials on mouse track balls.

BACKGROUND OF THE INVENTION

Conventionally, as mouse pads (the sheet placed under a mouse during VDT operation), soft flexible sheets, woven fabrics, knitted fabrics, non-woven fabrics, foamed materials or laminates thereof have been used. Although they make a track ball roll smoothly, when the track ball is stained for some reason such as after a long use or with human sweat in the summer season, it does not roll smoothly and must be cleaned to recover smooth rolling.

OBJECT OF THE INVENTION

This invention seeks to provide a new mouse pad which keeps the track ball clean so that it can roll smoothly for a long time without cleaning.

SUMMARY OF THE INVENTION

According to a first aspect, the present invention provides a mouse pad comprising a fibrous sheet made of ultrafine fibers, and a substrate.

According to a second aspect, the present invention provides a mouse pad package, a surface of the mouse pad of which comprises a fibrous sheet made of ultrafine fibers, wherein a part of the surface of the mouse pad or a piece made of substantially the same material is exposed so that a consumer can touch it directly so to confirm its touch and test its likely behavior as a mouse pad.

BRIEF DESCRIPTION OF THE DRAWINGS

Preferred embodiments of the invention will now be described in more detail with reference to the accompanying drawings, in which.

DETAILED DESCRIPTION OF THE INVENTION

Figure 1:
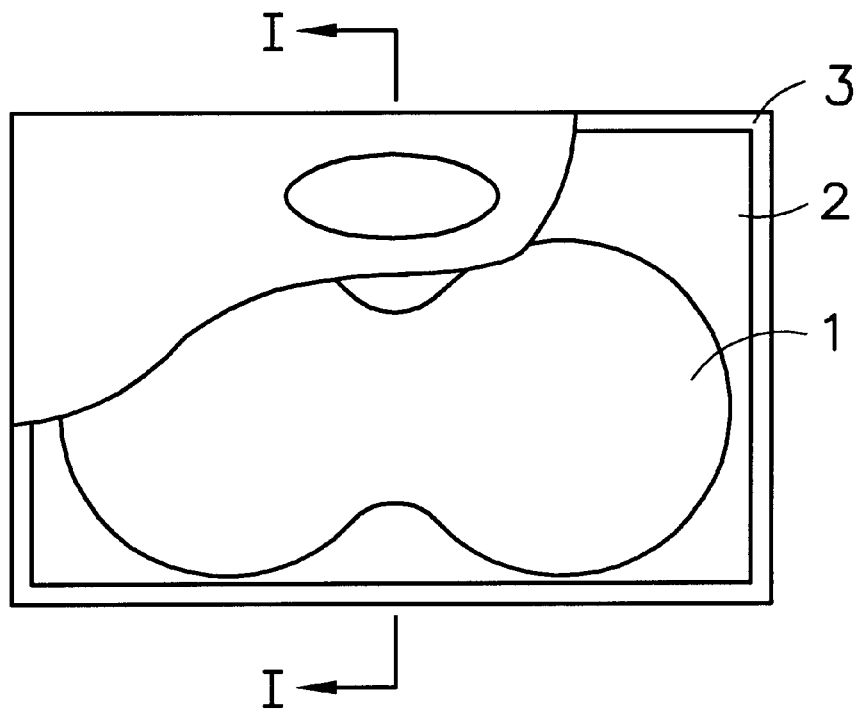
FIG. 1 shows a plan view of a typical example of a mouse pad package embodying the present invention, with a part of the casing broken away to reveal the mouse pad.
Figure 2:
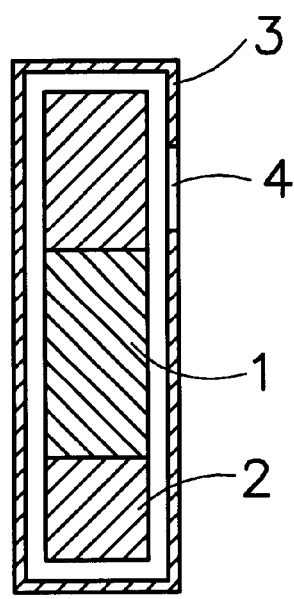
FIG. 2 shows a cross section of the mouse pad of FIG. 1 along the line I—I of FIG. 1.
Figure 3:
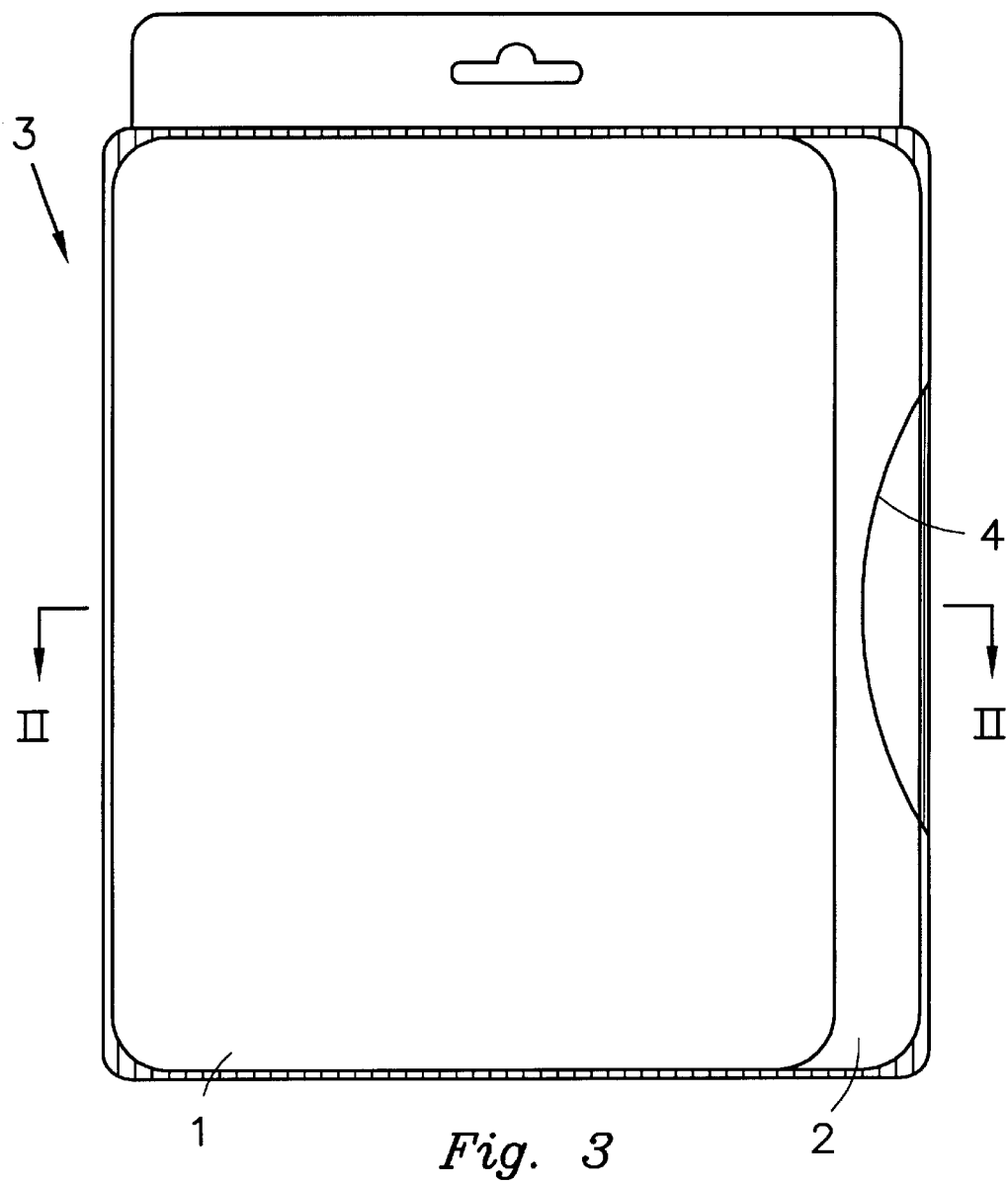
FIG. 3 shows a plan view of another typical example of a mouse pad package embodying the present invention having a transparent case.
Figure 4:
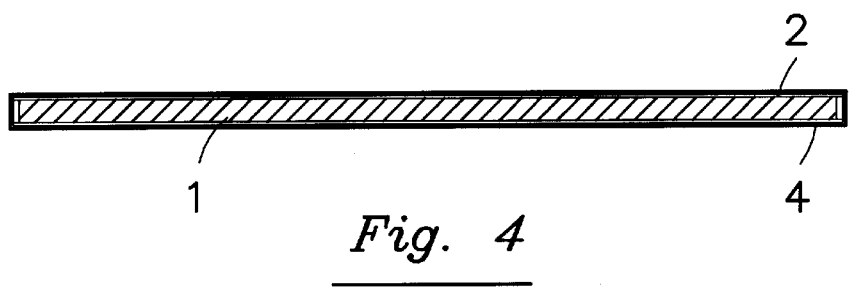
FIG. 4 shows a cross section of the mouse pad of FIG. 3 along the line II—II of FIG. 3.

Each of FIGS. 1 and 3 shows a mouse pad package comprising: a mouse pad 1, a separate test piece 2, each within a case 3, having an opening 4, exposing a part of the surface of the test piece 2, thereby allowing a prospective user to touch the surface, enabling him or her to assess the likely performance of the mouse pad 1, having a surface of a structure identical to that of the test piece 2.

The mouse pad of the invention has ultrafine fibers, the thickness of which is preferably about 0.00001–1 denier, more preferably, about 0.001–0.3 denier and still more preferably, about 0.01 to 0.1 denier. Surprisingly, such small thickness of the fibers allows the ball of the mouse to roll smoothly for a long time without cleaning the track ball. That means that the ultrafine fibers remove the stains of the ball as the ball rolls over the ultrafine fibers. The "fiber thickness" referred to herein means the weight average fiber thickness.

The fibrous sheet may be any kind of sheet as long as the top surface thereof, on which the track ball rolls, is covered with the ultrafine fibers. It may be, for example, a knitted fabric, woven fabric or non-woven fabric. It may contain some finishing agents or binder. However, for best results, the top surface is preferably substantially of ultrafine fibers alone.

Among the structures mentioned above, a non-woven fabric, especially such a fabric of which the top surface thereof is raised is preferred having regard to its appearance, soft touch and firm rolling of the track ball. Such raised fabrics are well known in the field of artificial suede. Of course, raised fabrics of woven or knitted fabrics are also preferred. Raising can be effected, for example, with sandpaper, a grindstone or picking with a needle etc.

Other kinds of sheet structure, such as those entangled (punched) with a water jet can also be used. Non-woven or loosely woven structures (such as twill or satin), of ultrafine fibers, can also be used, especially after entanglement by means of a water jet. A product having fibers entangled by means of a water jet is highly effective in cleaning a track ball since it has loops and spaces therein and has a firm structure which does not need a large amount of binder to maintain its structure. Since the cleaning effect is based on the fineness of the fibers, the effect is not damaged with washing. In any event, the cleaning effect is almost permanent in practical use even without washing.

Although many non-woven fabrics contain a certain amount of binder such as polyurethane, the binder does not present a problem as long as it does not drop from the fabric or it does not cover the top surface of the mouse pad which should come into contact with the track ball.

As for fiber material, any of polyesters, polyamides, acrylics, acetates, polyvinylchloride, cellulose and polypropylene can be used. Among them, polyesters, polyamides and acrylics are preferable since their ultrafine fiber fabrics are commercially available at reasonable cost. Generally speaking, it is preferable that the fibrous sheet made of ultrafine fibers is antielectrostatic so that any flying dust which might enter into the inside of the mouse does not stick to it. The fibrous sheet should also be selected having regard to this problem.

Of course, the mouse pad can be in any shape such as rectangular, elliptical, circular, gourd-shaped or the like. However, especially in the case of a tetragonal or square-shaped mouse pad, it is preferable that its corners are rounded.

According to another aspect, the present invention provides a mouse pad package wherein a part of the surface of the mouse pad or a piece made of substantially the same material is exposed to the exterior from an opening. Preferably, the exposed piece is a piece separate from the mouse pad so that consumers can confirm its touch and conduct a test as to how it functions as a mouse pad. Any consumer can confirm the touch and assess its likely behavior as a mouse pad by touching it through the opening. By presenting a separate test piece at the opening, the new mouse pad can remain unstained and is not worn away as a result of handling by consumers.

The fibrous sheet made of ultrafine fibers and the substrate are preferably laminated with an adhesive. However, they can also be combined by sewing or heat pressing to form a laminate. Adhesives which allow retention of the softness of the laminate, such as rubbery type adhesives, are preferable.

As a substrate, a foamed material, rubbery material or thick fiber sheet such as a thick non-woven fabric can be used. Among them, foamed or rubbery materials of, for example, polyurethane, polyethylene, chloroprene rubber, polyvinyl chloride or polypropylene, or a combination of any two or more of such materials is preferable because they are soft, clean and are commercially available at any thickness and at reasonable cost. The thickness of the substrate is preferably about 1–10 mm, more preferably about 2–8 mm so that the total thickness of the mouse pad becomes about 3–10 mm. However, in any event, the thickness should be selected so that the softness and bending property of the resulting laminate allows easy handling.

EXAMPLE 1

An artificial ultrasuede "Ecsaine" standard type (commercially available from Toray Industries, Inc., Japan) fibrous sheet which had a 0.5 mm thickness, 140 g/m$^2$ weight and 0.05–0.2 mm raised fiber length comprising a composite of 0.1 denier entangled (by needle punching) fibers and a polyurethane binder was laminated with chloroprene rubber foam having 4.0 mm thickness as a substrate. The resultant laminated mouse pad was 240 mm in length, 175 mm in width and 4.5 mm in thickness. This mouse pad was used continuously for a long time and evaluated by assessing the staining of the encoders of the mouse and the staining of the mouse itself at 50,000 and 100,000 meter rollings. The evaluation of the staining of the encoders was conducted by determination of the mean values of the width of stains of the three encoders which come into contact with the mouse ball. The staining of the mouse ball was evaluated by observation with the naked eye. The results are shown in Tables 1 and 2.

EXAMPLE 2

A knitted fabric having constituent filaments of 0.4 denier polyethyleneterephthalate and 0.2 denier nylon 6 was prepared. The weight ratio of the polyester/polyamide was 29/71 and the knitted fabric had many microloops of polyester filaments on the surface developed by the shrinkage of the polyester filaments. The knitted fabric had 0.3 mm thickness, 100 g/m$^2$ weight and the lengths of the microloops were in the range 0.05–0.2 mm.

A mouse pad of 240 mm length and 175 mm width was prepared by adhering the fabric to a 4 mm thick elastomer sheet.

This mouse pad, as in Example 1, was used continuously for a long time and evaluated by the staining of the encoders of the mouse and the staining of the mouse itself at 50,000 and 100,000 meter rollings. The results are shown in Tables 1 and 2.

Comparative Example 1

A knitted fabric having a 0.3 mm thickness and 100 g/m$^2$ weight made of yarns constituting 2 denier filaments was prepared. The fabric was adhered to the same substrate as in Example 1 to obtain a mouse pad having a 240 mm length, 175 mm width and 4.5 mm thickness. This mouse pad was evaluated as in Example 1 and the results are shown in Tables 1 and 2.

As shown in Examples 1 and 2, when using a mouse pad embodying the present invention, staining of the encoder roller and the mouse ball was not observed even after long use of the mouse. On the other hand, in the Comparative Example 1, after such long use, staining was observed on the mouse ball and rolling of the mouse ball was no longer smooth, which might have been attributable to staining of the encoder roller.

EXAMPLE 3

A mouse having encoder rollers which had been stained as a result of usage for several years was used as a mouse for a personal computer on a mouse pad prepared as in Example 1. The average time of actual use of the personal computer was more than 4 hours a day. The staining of the three encoder rollers after 1 month and after 2 months were as shown in Table 3. The staining was expressed by the maximum width of the stained zone (mm).

Comparative Example 2

A commercially available mouse pad made of rubber on which a silicone resin layer had been laminated and color printed was tested in the same way as in Example 3.

As shown in Example 3 and Comparative Example 2, the mouse pad embodying the present invention has a cleaning effect. On the other hand, the silicone resin layer does not have such an effect.

TABLE 1

| | Stain width of Encoder Roller (mm) after rolling | | |
|---|---|---|---|
| | 0 m | 50,000 m | 100,000 m |
| Example 1 | 0 | 0 | 0 |
| Example 2 | 0 | 0 | 0 |
| Comparative Example 1 | 0 | 1.7 | 2.5 |

TABLE 2

| | Staining of the mouse ball after rolling | | |
|---|---|---|---|
| | 0 m | 50,000 m | 100,000 |
| Example 1 | not stained | not stained | not stained |
| Example 2 | not stained | not stained | not stained |
| Comparative Example 1 | not stained | stained | stained |

TABLE 3

| | Stain width of Encoder Roller (mm) after using | | |
|---|---|---|---|
| | 0 month | 1 month | 2 months |
| Example 3 | | | |
| Roller 1 | 2.8 | 1.2 | 0 |
| Roller 2 | 2.5 | 1.2 | 0.5 |
| Roller 3 | 2.5 | 1.5 | 0.8 |
| Comp. Example 2 | | | |
| Roller 1 | 2.2 | 2.3 | 2.5 |
| Roller 2 | 1.7 | 1.7 | 1.7 |
| Roller 3 | 0 | 0 | 0.5 |

Although this invention has been described with reference to specific forms selected for illustration in the drawings, it will be appreciated that modifications may be made and that a wide variety of equivalent forms of apparatus and components may be used, all without departing from the spirit of this invention, which is defined by the appended claims.

What is claimed is:

1. The combination of a mouse for computer video display terminal operation, said mouse having a ball positioned for rotation within the body of said mouse, and a mouse pad positioned beneath said mouse, said mouse pad comprising a laminate of a fibrous sheet made of ultrafine fibers and a substrate wherein the ultrafine fibers have a weight average fiber thickness of about 0.00001–1 denier.

2. The combination according to claim 1, wherein the weight average fiber thickness of the ultrafine fibers is about 0.0001–0.3 denier.

3. The combination according to claim 2, wherein the weight average fiber thickness of the ultrafine fibers is about 0.01–0.1 denier.

4. The combination according to claim 1, wherein the fibrous sheet is a knitted fabric.

5. The combination according to claim 1, wherein the fibrous sheet is a woven fabric.

6. The combination according to claim 1, wherein the fibrous sheet is a non-woven fabric.

7. The combination according to claim 6, wherein the non-woven fabric is a raised fabric.

8. The combination according to claim 6, wherein the non-woven fabric comprises the ultrafine fibers and a binder.

9. The combination according to claim 1, wherein the substrate is a foamed material.

10. The combination according to claim 9, wherein the foamed material is a polyolefin foam or polyurethane foam.

11. The combination according to claim 1, having corners which are round.

12. The combination according to claim 1 wherein said fibrous sheet and said substrate are laminated with an adhesive.

13. The combination according to claim 1 wherein said fibrous sheet and said substrate are laminated by sewing.

14. The combination according to claim 1 wherein said fibrous sheet and said substrate are laminated by heat pressing.

15. The combination according to claim 1 wherein said substrate is about 1–10 mm in thickness.

16. The combination according to claim 1 wherein said ultrafine fibers are antielectrostatic.

17. The combination according to claim 1 wherein said ultrafine fibers are made from a material selected from the group consisting of polyesters, polyamides, acrylics, acetates, polyvinylchloride, cellulose and polypropylene.

* * * * *